United States Patent
Garg et al.

(10) Patent No.: US 11,954,663 B2
(45) Date of Patent: Apr. 9, 2024

(54) METHODS AND SYSTEMS FOR MERCHANT-INDUSTRY MAPPING BASED ON AMBIENT NOISE

(71) Applicant: MASTERCARD INTERNATIONAL INCORPORATED, Purchase, NY (US)

(72) Inventors: Aditi Garg, Kota (IN); Dinesh Kumar Lal, Gurgaon (IN); Priyanshee Palriwala, Ahmedabad (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 446 days.

(21) Appl. No.: 17/156,707

(22) Filed: Jan. 25, 2021

(65) Prior Publication Data

US 2021/0233050 A1   Jul. 29, 2021

(30) Foreign Application Priority Data

Jan. 23, 2020   (IN) .............................. 202041002991

(51) Int. Cl.
| | |
|---|---|
| G06Q 20/00 | (2012.01) |
| G06N 3/04 | (2023.01) |
| G06N 3/08 | (2023.01) |
| G06Q 20/16 | (2012.01) |
| G06Q 20/20 | (2012.01) |
| G10L 25/51 | (2013.01) |
| H04R 1/08 | (2006.01) |

(52) U.S. Cl.
CPC ............. *G06Q 20/202* (2013.01); *G06N 3/04* (2013.01); *G06N 3/08* (2013.01); *G06Q 20/16* (2013.01); *G10L 25/51* (2013.01); *H04R 1/08* (2013.01)

(58) Field of Classification Search
CPC ....................... G06Q 20/4015; G06Q 20/4016
USPC ........................................................... 705/21
See application file for complete search history.

(56) References Cited

U.S. PATENT DOCUMENTS

| | | | |
|---|---|---|---|
| 8,706,557 | B1 | 4/2014 | Tavares |
| 10,074,119 | B2 | 9/2018 | Zamer |
| 10,353,956 | B2 | 7/2019 | Fort et al. |
| 2011/0251907 | A1 | 10/2011 | Tavares et al. |
| 2014/0101043 | A1* | 4/2014 | Cincera ................ G06Q 20/425 705/44 |

(Continued)

*Primary Examiner* — Rokib Masud
(74) *Attorney, Agent, or Firm* — Jordan IP Law, LLC

(57) ABSTRACT

Embodiments provide a method and a system for conducting merchant-industry mapping based on ambient noise. The method includes receiving a payment transaction request and an audio signal comprising ambient noise in surrounding of a merchant terminal of a merchant. The ambient noise is recorded by the merchant terminal and includes a plurality of sounds. The method includes determining whether the merchant is an aggregated merchant or a non-aggregated merchant. The method includes processing the ambient noise to determine a type of the merchant upon determining that the merchant is the non-aggregated merchant. The method includes mapping the merchant to an industry from a plurality of industries available in the server system based on the type of the merchant. The method further includes storing the mapping of the industry and the merchant in a database associated with the server system.

17 Claims, 8 Drawing Sheets

(56) References Cited

U.S. PATENT DOCUMENTS

2017/0228713 A1 8/2017 Nichols et al.
2017/0300988 A1* 10/2017 Zamer ................ G06Q 30/0625

* cited by examiner

| S. No. | AMBIENT NOISE 602 | MERCHANT TYPE 604 |
|---|---|---|
| 1 | TROLLEY | GENERAL MERCHANDISE STORES |
| 2 | VEHICLES (CARS/TRUCKS) | AUTOMOTIVE FUEL STORES |
| 3 | WORDS RELATED TO HEALTH & MEDICINE | MEDICAL STORES |
| 4 | TV/MUSIC NOISE | ELECTRONIC STORES |
| 5 | UTENSIL NOISES/ SOFT CHATTER | RESTAURANTS |

600

| S. No. | INDUSTRY 702 | MERCHANT 704 |
|---|---|---|
| 1 | ACC (ACCOMMODATIONS) | AIRBNB (ON-LINE) |
| 2 | ACC (ACCOMMODATIONS) | NOVOTEL HOTELS |
| 3 | AFS (AUTOMOTIVE FUEL STORES) | 7-ELEVEN |
| 4 | EAP (EATING PLACES) | MCDONALD'S |
| 5 | TTL (TAXI AND LIMOUSINES) | UBER (NSR) |
| 6 | TTL (TAXI AND LIMOUSINES) | OLA CABS / OLA (ON-LINE) |
| 6 | GMS (GENERAL MERCHANDISE STORE) | WALMART |

700

METHODS AND SYSTEMS FOR MERCHANT-INDUSTRY MAPPING BASED ON AMBIENT NOISE

CROSS-REFERENCE TO RELATED APPLICATIONS

The present application claims priority to India Patent Application No. 202041002991 (filed on Jan. 23, 2020), which is hereby incorporated by reference in its entirety.

TECHNICAL FIELD

The present disclosure relates to data analytics in payment industry and, more particularly to, a method and a system for merchant-industry mapping using ambient noise.

BACKGROUND

Data related to businesses and customers is important in payment industry. Data is collected, analyzed and used at various points during a payment transaction, and plays a vital role in making sure that the payment reaches its intended destination. Basically, data is a key asset for a payment service provider (PSP) as the growth of the services provided by the provider depends directly on the data.

The 'payments data' is a mix of financial, transactional, behavioral and other types of data, which PSPs and other entities collect in the process of providing payment services to end users. Data analytics is performed on the payments data by the PSPs for analyzing patterns in the payment industry. An important component of data analytics is a creation of a reliable database as the data will be used directly from the database for analyzing patterns. The reliable database can only be created when data elements from the collected data are accurately stored in the database.

Merchant level information is one of the key data elements in the payments data. The merchant level information includes a plurality of associated fields such as industry, merchant category etc. Although information is validated through various means, but many fields lack accuracy despite multiple checks. Industry, being one of the key associated fields, lacks accuracy for small/non-aggregated (new) merchants. The accurate mapping of merchant-industry becomes more important because of the nature of analysis involved.

Therefore, there exists a need for automated processes that can detect the anomalies present in a particular field which will help in solving the problem of data inaccuracy. It would be advantageous to provide a technological solution to correctly map merchant to industry.

SUMMARY

Various embodiments of the present disclosure provide methods and systems for merchant-industry mapping using ambient noise.

In an embodiment, a method is provided. The method includes receiving, by a server system associated with a payment network, a payment transaction request and an audio signal including ambient noise in surrounding of a merchant terminal of a merchant. The ambient noise is recorded by the merchant terminal and includes a plurality of sounds. The method includes determining, by the server system, whether the merchant is an aggregated merchant or a non-aggregated merchant. The method includes processing, by the server system, the ambient noise to determine a type of the merchant upon determining that the merchant is the non-aggregated merchant. The method includes mapping, by the server system, the merchant to an industry from a plurality of industries available in the server system based on the type of the merchant. The method further includes storing, by the server system, the mapping of the industry and the merchant in a database associated with the server system.

In another embodiment, a server system in a payment network is provided. The server system includes a communication interface configured to receive a payment transaction request and an audio signal including ambient noise in surrounding of a merchant terminal of a merchant. The ambient noise includes a plurality of sounds. The server system includes a memory including executable instructions and a processor communicably coupled to the communication interface. The processor is configured to determine whether the merchant is an aggregated merchant or a non-aggregated merchant. The server system is further caused to process the ambient noise to determine a type of the merchant upon determining that the merchant is the non-aggregated merchant. The server system is further caused to map the merchant to an industry from a plurality of industries available in the server system based on the type of the merchant. The server system is further caused to store the mapping of the industry and the merchant in a database associated with the server system.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

Figure 1:
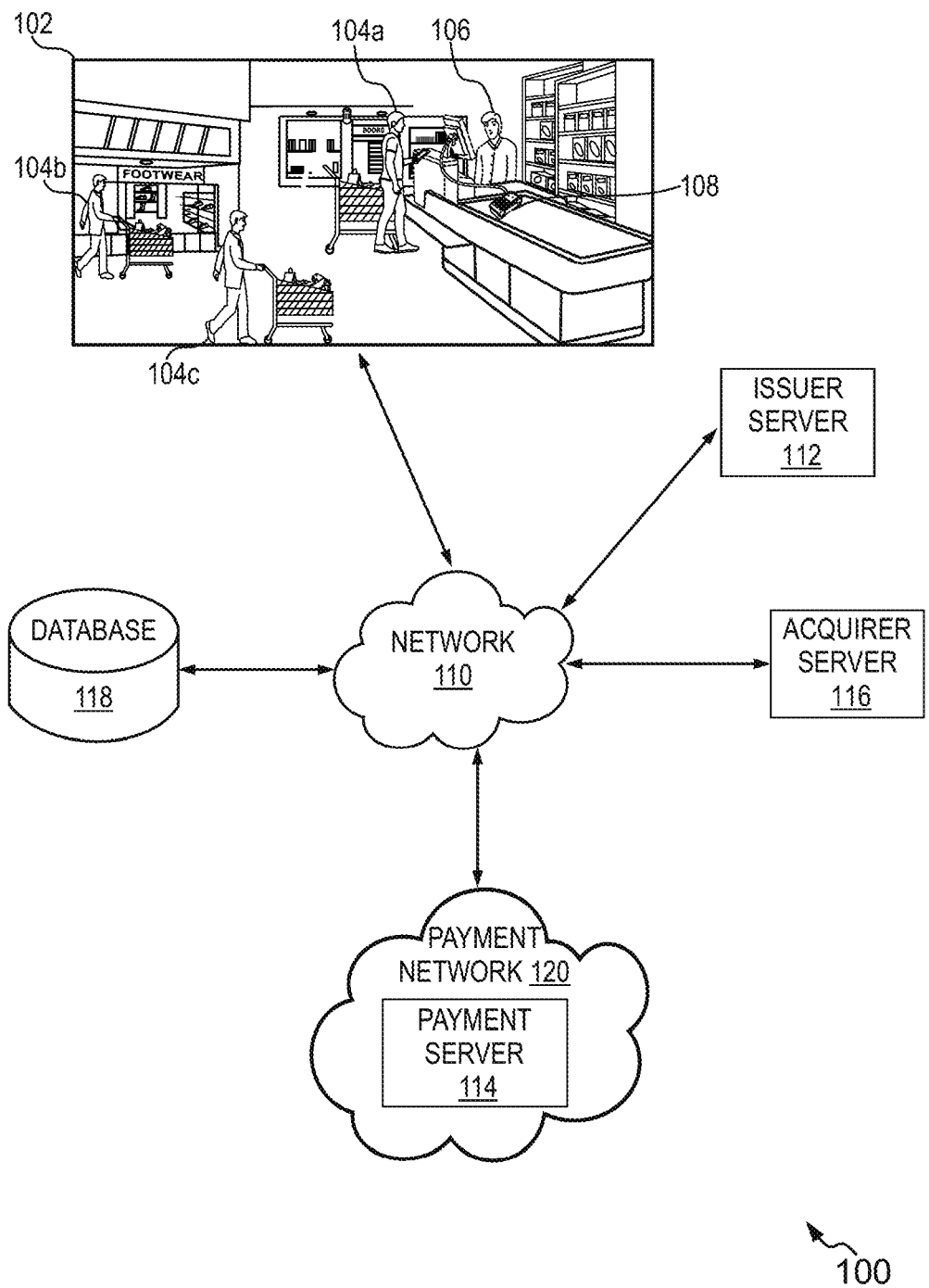
FIG. 1 is an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data (e.g., a digital token) stored in a user device, where the data is associated with payment account such that the data can be used to process the financial transaction between the payment account and a merchant's financial account.

The term "aggregated merchant", used throughout the description, refers to merchants whose information is already available in the system, and their industry type is already defined in a database available at the payment server. The term "non-aggregated merchant", used throughout the description, refers to merchants whose information is not available in the system, and in particularly, and their industry type is not already defined in the database available at the payment server.

Overview

Various example embodiments of the present disclosure provide a method and a system for merchant-industry mapping using ambient noise.

In various example embodiments, the present disclosure provides a method for mapping merchant to an industry based on ambient noise received from a merchant terminal. The merchant terminal used by a merchant records the ambient noise in surrounding of the merchant terminal while performing the payment transaction using a payment card. The merchant terminal creates a payment transaction request and an audio signal for further processing of the payment. The audio signal includes the ambient noise recorded by the merchant terminal. The merchant terminal further sends the payment transaction request and the audio signal to an acquirer server as part of the payment processing. The acquirer server sends the payment transaction request and the audio signal to a payment server for validating details included in the payment transaction request.

After receiving the payment transaction request and the audio signal, the payment server processes the ambient noise included in the audio signal to determine a type of the merchant as the ambient noise can have relevant information indicative of the type of the merchant. For example, if the ambient sound includes sound of trolleys then a type of the merchant can be a super market.

Further, the merchant is mapped to an industry from a plurality of industries available in the payment server based on the type of the merchant. The mapping of the industry and the merchant is stored in a database associated with the payment server. The database is updated with each payment transaction.

In an embodiment, a model of categorization of ambient noise is created in the payment server for aggregated merchants. The model of categorization includes the mapping of the industry and the merchant stored in the database. The model of categorization is trained after each payment transaction if the payment transaction request is received from the aggregated merchant using algorithms and models associated with neural networking, machine learning and artificial intelligence. So, when a new merchant (non-aggregated merchant) is detected, the industry for the merchant is automatically identified based on the ambient noise using the model of categorization.

Various example embodiments of present disclosure are described hereinafter with reference to FIGS. 1 to 8.

FIG. 1 illustrates an example representation of an environment 100, in which at least some example embodiments of the present disclosure can be implemented. The environment 100 typically represents a retail store environment where people come to purchase all their general goods or to avail services for which they need to make payment using a payment card. It will be appreciated to those skilled in the art that any other suitable environment where people can pay for their purchases using a payment card may be referred in the following discussion.

The environment 100 is depicted to include a network 110 that connects entities such as, a retail store 102, an issuer server 112, a payment server 114 and an acquirer server 116. Examples of the network 110 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 110 may be or include the Internet, intranets, extranets, microwave networks, satellite communications, cellular systems, personal communication services ("PCS"), infrared communications, global area networks, or other suitable networks, etc., or any combination of two or more such networks.

Various embodiments of the present disclosure provide mechanisms such that the merchant-industry mapping is accurately performed and stored in a database 118 associated with the payment server 114.

In an example scenario, as shown in FIG. 1, users 104*a*, 104*b*, 104*c* visit a merchant premise (e.g., the retail store 102) for purchasing their general goods. The user 104*a* has finished his purchasing and is standing at a billing counter managed by a merchant 106 for making a payment for his purchases. The user 104*a* gives his/her payment card to merchant 106 for making the payment. The merchant 106 performs a payment transaction using a merchant terminal 108. In an embodiment, the merchant terminal 108 is a point of sale (POS) terminal. The merchant terminal 108 is equipped with at least one microphone (not shown in FIG. 1) for recording the ambient noise in surrounding of the merchant terminal 108 of the merchant 106 while performing the payment transaction. In at least one example embodiment, the microphone may always record the ambient noise, or may perform intermittent recordings, for a predefined time (e.g., 30 seconds) of recording of the ambient noise while performing the payment transaction. The microphone is configured to generate an audio signal. The generated audio signal includes the ambient noise recorded by the merchant terminal 108. In another embodiment, the merchant terminal 108 can be any other device installed at the merchant place near the POS terminal.

In a non-limiting example, the process of payment transaction using the payment card is facilitated by a combination of the payment server 114, the issuer server 112 and an acquirer server 116. In one embodiment, a payment transaction request is sent to the payment server 114 associated with a payment network 120 by the merchant terminal 108 using the network 110. The payment network 120 may be used by the payment cards issuing authorities as a payment interchange network. Examples of payment interchange network include, but not limited to, Mastercard® payment system interchange network. The Mastercard® payment system interchange network is a proprietary communications standard promulgated by Mastercard International Incorporated® for the exchange of financial transaction data between financial institutions that are members of Mastercard International Incorporated®. (Mastercard is a registered trademark of Mastercard International Incorporated located in Purchase, N.Y.).

The issuer server 112 is associated with a financial institution normally called as an "issuer bank" or "issuing bank" or simply "issuer", in which a user (e.g., the user 104*a*) may have an account, which issues the payment card, such as a credit card or a debit card.

To accept payment using the payment card based payment transaction, a merchant (e.g., the merchant 106) must normally establish an account with a financial institution that is part of a financial payment system. This financial institution is usually called a "merchant bank" or an "acquiring bank" or an "acquirer bank" or simply "acquirer". The acquirer server 116 is associated with the acquirer bank.

Further, the merchant terminal 108 may send the payment transaction request to the payment server 114 via the acquirer server 116 using the payment network 120. The payment transaction request may include card details of the user 104*a*, amount that the user 104*a* needs to pay for the purchases, personal identification number (PIN) associated with the payment card, merchant information and the audio signal generated by the merchant terminal 108. In an embodiment, the payment transaction request may not include the audio signal and the audio signal may be sent separately by the merchant terminal 108 to the payment server 114 along with some merchant information (e.g., merchant id) so that the payment server 114 knows the audio signal belongs to which merchant. In that case, the merchant terminal 108 may send the audio signal to the payment server 114 before or after the payment transaction request.

Once the payment transaction request is received by the payment server 114, the payment server 114 may want to store data associated with the payment transaction request in the database 118 before settling the payment between the merchant 106 and the user 104*a*. In an embodiment, for settling the payment between the merchant 106 and the user 104*a*, the payment server 114 is configured to send the payment transaction request to the issuer server 112 for processing a payment from a user account of a payment card holder associated with the issuer server 112 to a merchant account of the merchant 106 associated with the acquirer server 116. The stored data may help the payment card issuing authorities in performing data analytics which will further help in growth of service delivery. The data may include information, such as merchant identification (ID), merchant category etc. The information about industry to which the merchant 106 belongs may also be required for maintaining merchant level information in the database 118.

For determining the industry associated with the merchant 106, processor of the payment server 114 may process the ambient noise included in the audio signal received with the payment transaction request as the ambient noise can be indicative of a type of a merchant. For example, ambient noise in a retail store (e.g., the retail store 102) may involve sound of trolleys. Similarly, utensil noise can be indicative of an eating place/restaurant. So, by processing the ambient/background noise that is recorded at the merchant premise while performing payment transaction, we can easily determine the type of merchant. Once the type of merchant is identified from the ambient noise, an industry is identified from a plurality of industries available in the database 118 associated with the payment server 114 based on the type of merchant. Further, a mapping is performed between the merchant 106 and the identified industry for the merchant 106. The mapping is stored in the database 118 for future reference. The merchant level information stored in the database 118 may keep on updating with each payment transaction.

Artificial intelligence algorithms along with deep learning and neural networking are used for training the payment server 114 with each payment transaction. In an embodiment, support vector machine and classification model are used for training the payment server 114. So, when a new merchant/non-aggregated merchant is identified by the payment server 114, the payment server 114 automatically maps the new merchant with the associated industry based on the ambient noise received with the payment transaction request.

Some non-exhaustive example embodiments of performing merchant-industry mapping using ambient noise are described with reference to FIGS. 2 to 7.

Figure 2:
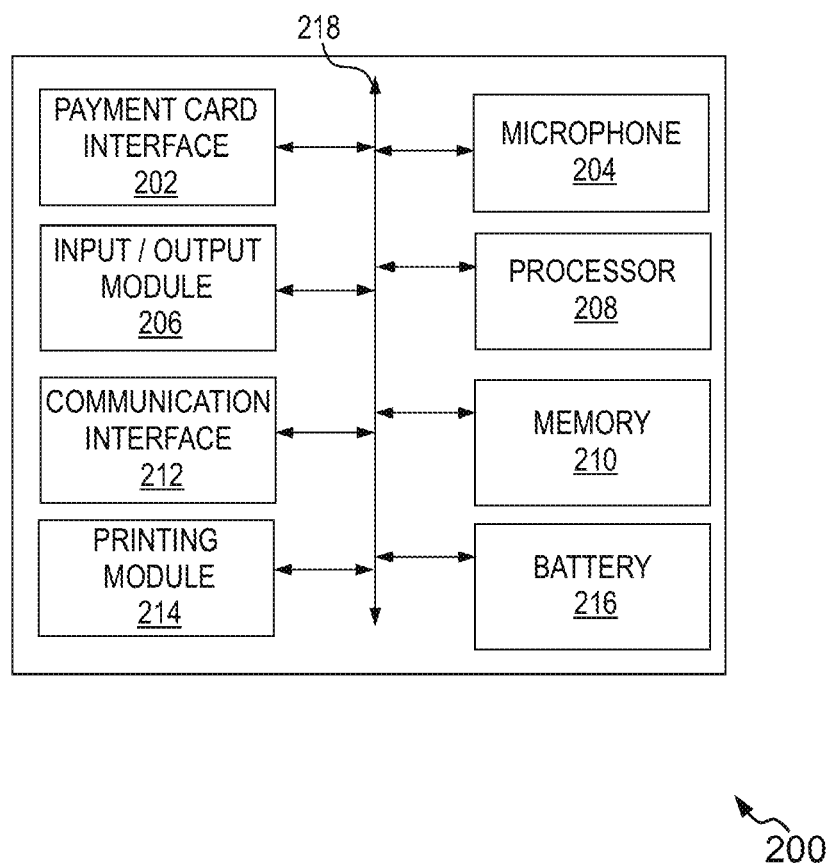
FIG. 2 is a simplified block diagram of a merchant terminal for facilitating a payment transaction and recording ambient noise, in accordance with an example embodiment of the present disclosure.

FIG. 2 is a simplified block diagram of a merchant terminal 200 for facilitating a payment transaction and recording ambient noise, in accordance with an embodiment of the present disclosure. The merchant terminal 200 is an example of the merchant terminal 108 shown in FIG. 1.

The merchant terminal 200 includes a payment card interface 202, at least one microphone 204, an input/output module 206, at least one processor 208, a memory 210, a communication interface 212, a printing module 214, a battery 216 and a centralized circuitry 218. The components of the merchant terminal 200 provided herein may not be exhaustive and that the merchant terminal 200 may include more or fewer components than those depicted in FIG. 2. Further, two or more components may be embodied in one single component, and/or one component may be configured using multiple sub-components to achieve the desired functionalities. Some components of the merchant terminal 200 may be configured using hardware elements, software elements, firmware elements and/or a combination thereof.

The payment card interface 202 is configured to receive details of a payment card provided by a user (e.g., the user 104a) for making payment for his/her purchases. In an embodiment, the payment card is inserted into (or swiped in) the merchant terminal 200 for performing a payment transaction.

The microphone 204 is configured to record ambient noise in surrounding of the merchant terminal 200 while performing the payment transaction. The microphone 204 is also configured to generate an audio signal. The audio signal includes the recording of the ambient noise.

In an embodiment, the input/output module 206 may include mechanisms configured to receive inputs from and provide outputs to a merchant (e.g., the merchant 106)/user. To that effect, the I/O module 206 may include at least one input interface and/or at least one output interface. In at least one example embodiment, the input interface is configured to receive the PIN associated with the payment card as provided by the user. Examples of the input interface may include, but are not limited to, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a speaker, a ringer, a vibrator, and the like.

The processor 208 is configured to execute executable instructions stored in the memory 210 to cause the merchant terminal 1120 to record the ambient noise in surrounding of the merchant terminal while performing the payment transaction. The processor 208 is also configured to generate a payment transaction request to be sent to an acquirer server (e.g., the acquirer server 116) for facilitating payment settlement between the payment card of the user and a merchant account of the merchant. The processor 208 is further configured to send operating instructions to the microphone 204 for starting and ending the recording of the ambient noise.

The processor 208 is operatively coupled to the communication interface 212 such that the merchant terminal 200 is capable of communicating with a server, such as the acquirer server 116, for sending the payment transaction request using a network (e.g., the network 110). The processor 208 is also configured to send operating instructions to the printing module 214 for initiating printing of a receipt for the merchant as well as the user when the payment transaction is completed. The battery 216 is configured to power the merchant terminal 200 so that the merchant terminal 200 can be operated for making payments.

Moreover, the various components of the merchant terminal 200, such as the payment card interface 202, the microphone 204, the I/O module 206, the processor 208, the memory 210, the communication interface 212, the printing module 214 and the battery 216 may be configured to communicate with each other via or through the centralized circuitry 218. The centralized circuitry 218 may be various devices configured to, among other things, provide or enable communication between the components (202-216) of the merchant terminal 200. In certain embodiments, the centralized circuitry 218 may be a central printed circuit board (PCB) such as a motherboard, a main board, a system board, or a logic board. The centralized circuitry 218 may also, or alternatively, include other printed circuit assemblies (PCAs) or communication channel media. In some embodiments, the centralized circuitry 218 may include appropriate storage interfaces to facilitate communication among the components (202-216). Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the merchant terminal 200 with access to the data stored in a memory.

Figure 3:
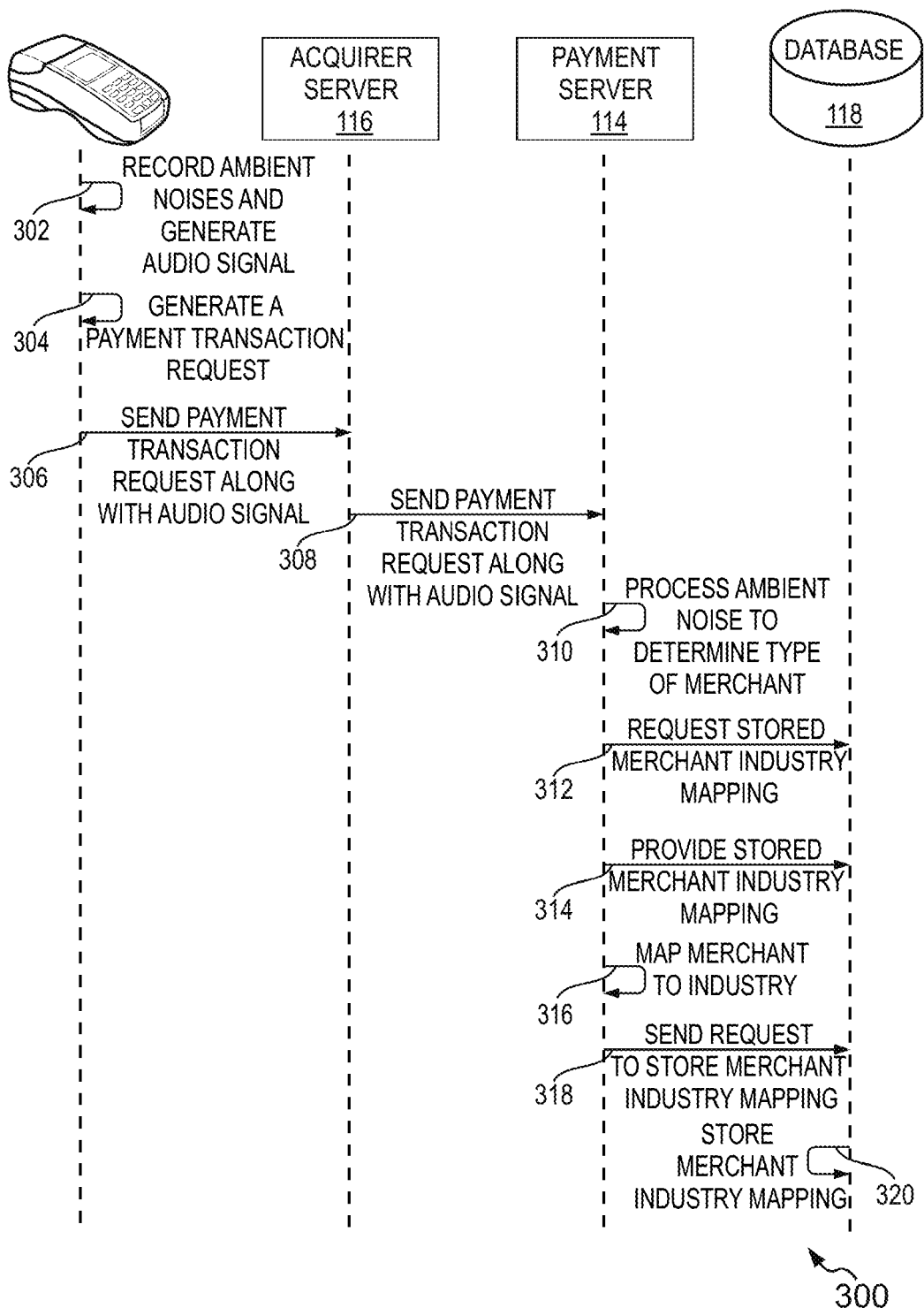
FIG. 3 is a sequence flow diagram of performing merchant-industry mapping using ambient noise, in accordance with an example embodiment of the present disclosure.

FIG. 3 represents a sequence flow diagram 300 of performing merchant-industry mapping using ambient noise, in accordance with an example embodiment of the present disclosure. The merchant terminal 108 is described with reference to FIG. 1. In an illustrative example scenario, a user visits the merchant 106 for paying for the purchases of the general goods (or services availed from the merchant 106) using a payment card. The merchant 106 performs a payment transaction using a merchant terminal, such as the merchant terminal 108 of FIG. 1.

At 302, the merchant terminal 108 records ambient noise in surrounding of the merchant terminal 108 while performing the payment transaction and generates an audio signal. The audio signal includes the recorded ambient noise. At 304, the merchant terminal 108 generates a payment transaction request. The payment transaction request includes card details of the user, amount that the user needs to pay for the purchases, personal identification number (PIN) associated with the payment card, and merchant information.

At 306, the merchant terminal 108 sends the payment transaction request to the acquirer server 116 along with the generated audio signal for further processing. At 308, the acquirer server 116 sends the payment transaction request to the payment server 114 for validation along with the generated audio signal. At 310, the payment server 114 processes the recorded ambient noise included in the audio signal received from the acquirer server 116 to determine a type of a merchant as the ambient noise can be indicative of the type of a merchant. For example, if the ambient noise includes sounds of vehicles such as cars and trucks, then the merchant can be a fuel store. Similarly, if the ambient noise includes sounds of television or music, then the merchant can possibly be an electronic store.

At 312, the payment server 114 sends a request to the database 118 for providing information about the stored merchant-industry mapping in the database 118. At 314, the database 118 sends the information about the stored merchant-industry mapping to the payment server 114.

At 316, upon receiving the stored merchant-industry mapping, the payment server 114 maps the merchant 106 to an industry from a plurality of industries available in the server system based on the type of merchant and the received merchant-industry mapping. For example, if by processing the ambient noise, it is determined that the merchant 106 can be a retail store and merchant-industry mapping received from the database suggests that the industry associated with the retail store is general merchandise store (GMS), so the merchant 106 will be mapped with the GMS industry.

At 318, the payment server 114 sends a request to the database 118 to store the identified mapping between the merchant 106 and the industry. At 320, the database 118 stores the identified mapping between the merchant 106 and the industry.

Figure 4:
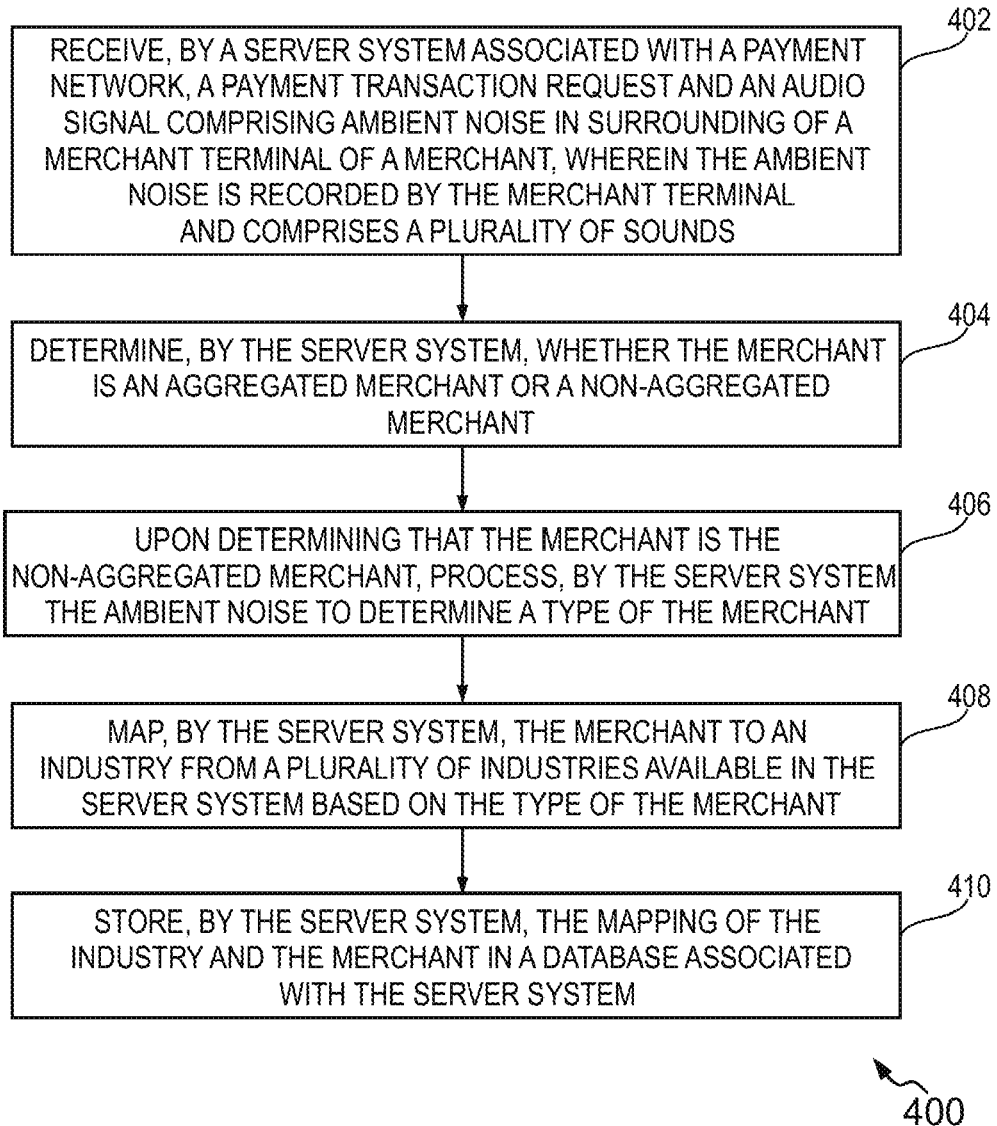
FIG. 4 is a flow diagram depicting a method for merchant-industry mapping using ambient noise, in accordance with an example embodiment of the present disclosure.

FIG. 4 illustrates a flow diagram depicting a method 400 for performing merchant-industry mapping using ambient noise, in accordance with an example embodiment of the present disclosure. The method 400 depicted in the flow diagram may be executed by, for example, a server system. The server system is an example of payment server 114 shown in FIG. 1. Operations of the method 400, and combinations of operation in the method 400, may be implemented by, for example, hardware, firmware, a processor, circuitry and/or a different device associated with the execution of software that includes one or more computer program instructions. The method 400 starts at operation 402.

At operation 402, the method 400 includes receiving a payment transaction request and an audio signal including ambient noise in surrounding of a merchant terminal of a merchant. The payment transaction request and the audio signal sent by an acquirer server (e.g., the acquirer server 116) are received by the server system for verification. The payment transaction request includes card details of a user (e.g., the user 104*a*), amount that the user needs to pay for the purchases, personal identification number (PIN) associated with a payment card, and merchant information which will be required for verifying a payment cardholder so that a payment can be settled between the merchant and the user. In an embodiment, the merchant terminal is a POS terminal and includes at least one microphone for recording the ambient noise while performing a payment transaction. The ambient noise includes a plurality of sounds which can be processed to indicate a type of a merchant.

At operation 404, the method 400 includes determining whether the merchant is an aggregated merchant or a non-aggregated merchant. In an embodiment, aggregated merchant refers to merchants whose information is already available with the server system and the non-aggregated merchant (new merchant) refers to merchants whose information is not available with the server system. The merchant information included in the payment transaction request is used to determine whether the merchant is a new merchant or an already existing merchant. Herein, for the purposes of present description, a new merchant or non-aggregated merchant can be understood with a merchant for which merchant industry is not defined, or which needs validation even if defined in the database available at the server system.

At operation 406, the method 400 includes processing the ambient noise to determine a type of the merchant upon determining that the merchant is the non-aggregated merchant. The ambient noise includes a plurality of sounds that are present when the payment transaction is being performed on the merchant terminal. For processing the ambient noise, first one or more attributes are extracted for each sound of the plurality of sounds in the ambient noise. The one or more attributes include, but are not limited to, amplitude, frequency, time and phase. Then each attribute of the one or more attributes with same attribute of the plurality of sounds in the ambient noise is combined to create a variable associated with each attribute. For example, attributes such as amplitude, frequency, time and phase are extracted for each sound of the plurality of sounds in the ambient noise. Then, amplitude of each noise is combined together to form an amplitude variable. Similarly, frequency of each noise is combined together to form a frequency variable and phase of each noise is combined together to form a phase variable. Further, the variable associated with each attribute is used to identify a prominent sound wave available in the ambient noise. The amplitude variable, frequency variable and phase variable are combined to identify a prominent sound wave in the ambient noise. In an embodiment, the prominent sound wave represents the sound that will be more prominent near the merchant. The prominent sound wave is the primary identifier of the type of merchant. For example, in general merchandise store, there will be a plurality of sounds like moving trolleys, conversations between different users, sounds associated with picking and dropping of products, but the sound of moving trolleys is the prominent sound that we hear in the general merchandise store and is the primary identifier of the type of merchant.

Once the prominent wave is identified, the industry for the non-aggregated merchant will be determined based on the prominent sound wave using a model of categorization.

At operation 408, the method 400 includes mapping the merchant to an industry from a plurality of industries available in the server system based on the type of the merchant. The merchant is mapped to the industry from the plurality of industries available in the server system based on the type of the merchant using the model of categorization. The model of categorization will be utilized to map the non-aggregated merchant to the industry from the available plurality of industries. In an embodiment, the model of categorization of ambient noise is created for aggregated merchants. The model of categorization is created from the mapping of the industry and the aggregated merchant stored in the database. The model of categorization includes the mapping of the industry and the aggregated merchant. The model of categorization created in the server system is trained after each payment transaction using algorithms of machine learning, artificial intelligence and neural networking if the payment transaction request is received from the aggregated merchant. The generated model of categorization is used to determine an industry for the non-aggregated merchant.

At operation 410, the method 400 includes storing the mapping of the industry and the non-aggregated merchant in a database associated with the server system. The merchant-industry mapping identified at the operation 408 will be stored in the database (e.g., the database 118). The updating of the database may trigger the updating of the model of categorization as the non-aggregated merchant is no longer the non-aggregated merchant.

Figure 5:
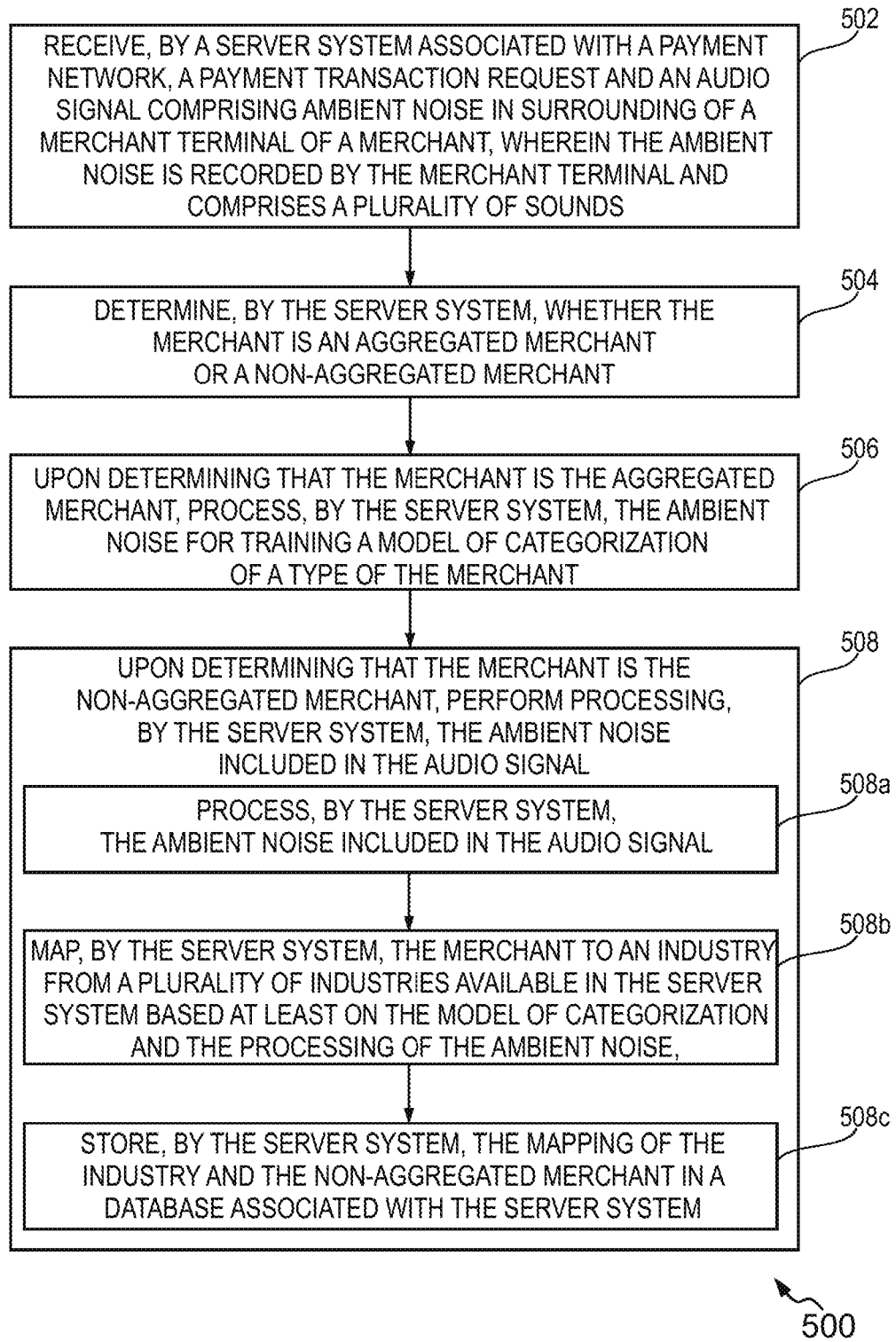
FIG. 5 is a flow diagram depicting a method for merchant-industry mapping using ambient noise, in accordance with another example embodiment of the present disclosure.

FIG. 5 illustrates a flow diagram depicting a method 500 for performing merchant-industry mapping using ambient noise, in accordance with another example embodiment of the present disclosure. The method 500 depicted in the flow diagram may be executed by, for example, a server system. The server system is an example of payment server 114 shown in FIG. 1. Operations of the method 500, and combinations of operation in the method 500, may be implemented by, for example, hardware, firmware, a processor, circuitry and/or a different device associated with the execution of software that includes one or more computer program instructions. The method 500 starts at operation 502.

At operation 502, the method 500 includes receiving a payment transaction request and an audio signal including ambient noise in surrounding of a merchant terminal of a merchant. The payment transaction request and the audio signal sent by an acquirer server (e.g., the acquirer server 116) are received by the server system for verification. The payment transaction request includes card details of a user (e.g., the user 104a), amount that the user needs to pay for the purchases, personal identification number (PIN) associated with a payment card, and merchant information which will be required for verifying a payment cardholder so that a payment can be settled between the merchant and the user. In an embodiment, the merchant terminal is a POS terminal and includes at least one microphone for recording the ambient noise while performing a payment transaction. The ambient noise includes a plurality of sounds which can be processed to indicate a type of a merchant.

At operation 504, the method 500 includes determining whether the merchant is an aggregated merchant or a non-aggregated merchant. In an embodiment, aggregated merchant refers to merchants whose information is already available with the server system and the non-aggregated merchant (new merchant) refers to merchants whose information is not available with the server system. The merchant information included in the payment transaction request is used to determine whether the merchant is a new merchant or an already existing merchant.

At operation 506, the method 500 includes processing the ambient noise for training a model of categorization upon determining that the merchant is the aggregated merchant. The ambient noise includes a plurality of sounds that are present when the payment transaction is being performed on the merchant terminal. For processing the ambient noise, first one or more attributes are extracted for each sound of the plurality of sounds in the ambient noise. The one or more attributes include, but are not limited to, amplitude, frequency, time and phase. Then each attribute of the one or more attributes with same attribute of the plurality of sounds in the ambient noise are combined to create a variable associated with each attribute. For example, attributes such as amplitude, frequency, time and phase are extracted for each sound of the plurality of sounds in the ambient noise. Then, amplitude of each noise is combined together to form an amplitude variable. Similarly, frequency of each noise is combined together to form a frequency variable and phase of each noise is combined together to form a phase variable. Further, the variable associated with each attribute is used to identify a prominent sound wave available in the ambient noise. The amplitude variable, frequency variable and phase variable are combined to identify a prominent sound wave in the ambient noise. In an embodiment, the prominent sound wave represents the sound that will be more prominent near the merchant. The prominent sound wave is the primary identifier of the type of merchant. For example, in general merchandise store, there will be a plurality of sounds like moving trolleys, conversations between different users, sounds associated with picking and dropping of products, but the sound of moving trolleys is the prominent sound that we hear in the general merchandise store and is the primary identifier of the type of merchant.

Once the prominent wave is identified, each attribute of the one or more attributes of each sound is combined to form a sound wave corresponding to each sound. The attributes, such as amplitude, frequency and phase of each sound are combined to uniquely identify a sound wave associated with each sound. The sound waves associated with each sound may act as a secondary identifier for the industry of the merchant. As discussed in the previous example of the general merchandise store, the sounds associated with picking and dropping of products may act as the secondary identifier for the type of the merchant. Further, the phase angle of the prominent sound wave and sound wave associated with each sound are determined which will be used to determine the type of merchant.

When the type of merchant is determined, mapping of the merchant to the industry will be performed. The produced mapping for the aggregated merchants will be used to create and train the model of categorization.

At operation 508, the method 500 includes performing operations 508a to 508c upon determining that the merchant is the non-aggregated merchant.

At operation 508a, the method 500 includes processing the ambient noise included in the audio signal. The ambient noise included in the audio signal is processed in a same way as described earlier in operation 506.

At operation 508b, the method 500 includes mapping the merchant to an industry from a plurality of industries available in the server system based at least on the model of categorization and the processing of the ambient noise. The merchant is mapped to the industry from the plurality of industries available in the server system based on the generated model of categorization and the processing of the ambient noise.

At operation 508c, the method 500 includes storing the mapping of the industry and the non-aggregated merchant in the database associated with the server system.

Figure 6:
FIG. 6 is an example representation showing a categorization of a type of a merchant based on ambient noise, in accordance with an example embodiment of the present disclosure.

FIG. 6 shows an example representation 600 showing a categorization of a type of a merchant based on ambient noise, in accordance with an example embodiment of the present disclosure. The example representation 600 includes an ambient noise section 602 and a merchant type section 604. The ambient noise section 602 represents the prominent noises that can be heard at some common merchant premises which are displayed in the corresponding merchant type section 604.

As shown in the FIG. 6, the sound of trolleys is the prominent noise that we hear in a general products store; so, type of merchant will be general merchandise store. Similarly, vehicle sounds are indicative of a petrol pump, so, type of merchant will be automotive fuel store; words related with health and medicine are usually used in medical facilities, so, type of merchant will be medical store; television/music noise is generally heard in electronic appliances store, so, type of merchant will be electronic store and utensil noise or soft chatter is heard generally at food places, so, type of merchant will be a restaurant.

Figure 7:
FIG. 7 is an example representation showing a merchant-industry mapping for some aggregated merchants, in accordance with an example embodiment of the present disclosure.

FIG. 7 shows an example representation 700 showing a merchant-industry mapping for some examples of non-aggregated merchants, in accordance with an example embodiment of the present disclosure. The example representation 700 includes an industry section 702 and a merchant section 704. The industry section 702 represents an industry to which a merchant displayed in a corresponding merchant section 704 belongs. A plurality of industries along with their industry codes are predefined in the database 118 associated with the payment server 114. The industry is selected for the merchant from the plurality of industries based on the ambient noise.

Figure 8:
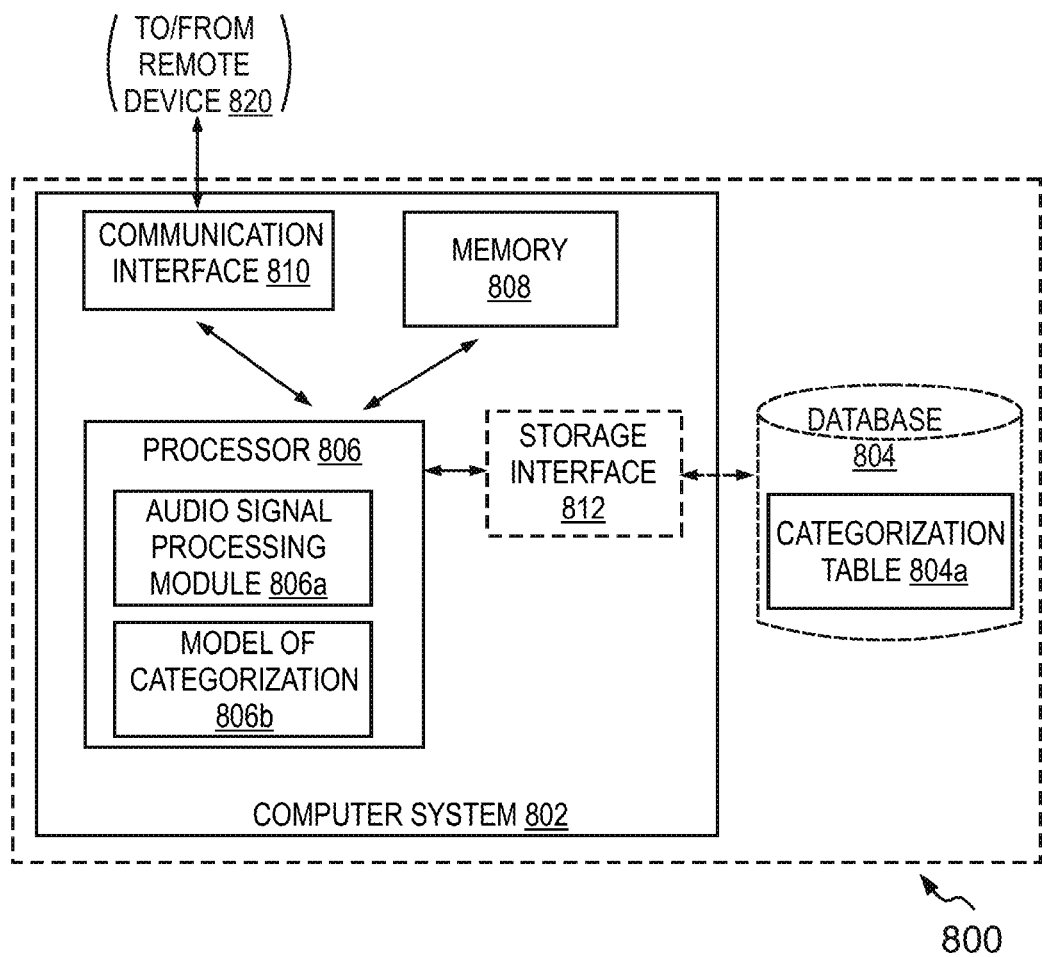
FIG. 8 is a simplified block diagram of a server system for facilitating merchant-industry mapping using ambient noise, in accordance with an embodiment of the present disclosure.

As shown in FIG. 7, as 'AIRBNB' provides accommodations, so recommended industry will be ACC that stands for 'Accommodations'. Similarly, 'MCDONALDS' is a food joint, so recommended industry will be EAP that stands for 'Eating Place'; 'UBER' and 'OLA' provide taxi services, so recommended industry for them will be TTL that stands for 'Taxi and Limousines' and 'WALMART' is a store that provides everyday items, so recommended industry will be GMS that stands for 'General Merchandise Store', FIG. 8 is a simplified block diagram of a server system 800, in accordance with an embodiment of the present disclosure. The server system 800 is an example of a payment server (e.g., the payment server 114) that is a part of the payment network 120. The server system 800 includes a computer system 802 and a database 804. The computer system 802 includes at least one processor 806 configured to execute executable instructions for providing various features of the present disclosure. The executing instructions are stored in a memory 808. The components of the computer system 802 provided herein may not be exhaustive and the computer system 802 may include more or fewer components than those depicted in FIG. 8. Further, two or more components may be embodied in one single component, and/or one component may be configured using multiple sub-components to achieve the desired functionalities. Some components of the computer system 802 may be configured using hardware elements, software elements, firmware elements and/or a combination thereof.

The processor 806 is configured to facilitate merchant-industry mapping using ambient noise recorded at a merchant terminal while performing a payment transaction. The processor 806 is operatively coupled to a communication interface 810 such that computer system 802 is capable of communicating with a remote device 820, for example, the merchant terminal 108 or communicates with any entity within the payment network 120. In an embodiment, the communication interface 810 is configured to receive a payment transaction request and an audio signal from the acquirer server 116 for verifying the user details and storing the merchant details in the database 804 associated with the server system 800. The communication may be achieved through API calls, without loss of generality.

The processor 806 may also be operatively coupled to the database 804. The database 804 is any computer-operated hardware suitable for storing and/or retrieving data, such as, but not limited to, merchant category, merchant id, merchant-industry mapping etc. The database 804 may include multiple storage units such as hard disks and/or solid-state disks in a redundant array of inexpensive disks (RAID) configuration. The database 804 may include a storage area network (SAN) and/or a network attached storage (NAS) system.

In some embodiments, the database 804 is integrated within computer system 802. For example, the computer system 802 may include one or more hard disk drives as the database 804. In other embodiments, the database 804 is external to the computer system 802 and may be accessed by the computer system 802 using a storage interface 812. The storage interface 812 is any component capable of providing the processor 806 with access to the database 804. The storage interface 812 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 806 with access to the database 804.

In at least one example embodiment, the database 804 includes a categorization table 804*a*. The categorization table 804*a* is configured to store the mapping of the industry and the aggregated merchant based on the ambient noise.

In an embodiment, the processor 806 may include an audio signal processing module 806*a* and a model of categorization 806*b*. The audio signal processing module 806*a* is configured to process the audio signal received from the acquirer server 116 for determining a type of the merchant. The information about the type of the merchant will be further used to determine an industry associated with the merchant. The model of categorization 806*b* is an auto learning module created from the mapping of the industry and the aggregated merchant stored in the categorization table 804*a* of the database 804. The model of categorization 806*b* may be used to determine an industry for the non-aggregated merchant.

Without limiting the scope of the present disclosure, the one or more example embodiments disclosed herein are to provide a method and a system for merchant-industry mapping using ambient noise which will improve the merchant-industry mapping by removing anomalies present in an industry field of a table describing merchant level information. Further, the improved mapping will help in providing better insights into various industry centric behaviors that will help the payment service provider in growing its service delivery.

The disclosed methods with reference to FIGS. 1 to 8, or one or more operations of the methods 400 and 500 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 800 (e.g. payment server 114) and its various components such as the computer system 802 and the database 804 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:
1. A computer-implemented method, comprising:
receiving, by a server system associated with a payment network, a payment transaction request and an audio signal comprising an ambient noise in surrounding of a merchant terminal of a merchant, wherein the ambient noise is recorded by the merchant terminal and comprises a plurality of sounds;
determining, by the server system, whether the merchant is an aggregated merchant or a non-aggregated merchant;
upon determining that the merchant is the non-aggregated merchant,
processing, by the server system, the ambient noise to determine a type of the merchant;
mapping, by the server system, the merchant to an industry from a plurality of industries available in the server system based on the type of the merchant; and
storing, by the server system, the mapping of the industry and the merchant in a database associated with the server system,
wherein upon determining that the merchant is the aggregated merchant, performing:
extracting one or more attributes for each sound of the plurality of sounds in the ambient noise;
combining each attribute of the one or more attributes with same attribute of the plurality of sounds in the ambient noise to create a variable associated with each attribute;
using the variable associated with each attribute to identify a prominent sound wave available in the ambient noise;
combining each attribute of the one or more attributes of each sound to form a sound wave corresponding to each sound;
determining phase angle of the prominent sound wave and the sound wave associated with each sound;
using the phase angle of the prominent sound wave and the sound wave associated with each sound to determine the type of the merchant;
mapping the merchant to the industry based on the type of the merchant using the phase angle of the prominent sound wave and the sound wave associated with each sound; and
storing a merchant-industry mapping for the aggregated merchant in the database.

2. The computer-implemented method as claimed in claim 1, wherein the server system is a payment server configured to send the payment transaction request to an issuer server for processing a payment from a user account of a payment cardholder associated with the issuer server to a merchant account of the merchant associated with an acquirer server.

3. The computer-implemented method as claimed in claim 1, wherein the merchant terminal is a point of sale (POS) terminal installed at a merchant place while performing a payment transaction, the POS terminal comprising at least one microphone for recording the ambient noise and generating the audio signal.

4. The computer-implemented method as claimed in claim 1, wherein the one or more attributes comprise:
amplitude;
frequency;
time; and
phase.

5. The computer-implemented method as claimed in claim 1, further comprising:
creating a model of categorization of the ambient noise for the aggregated merchant, the model of categorization comprising the merchant-industry mapping; and
training the model of categorization after each payment transaction if the payment transaction request is received from the aggregated merchant using neural networking, machine learning and artificial intelligence.

6. The computer-implemented method as claimed in claim 5, wherein processing the ambient noise comprises:
extracting the one or more attributes for each sound of the plurality of sounds in the ambient noise;

combining each attribute of the one or more attributes with same attribute of the plurality of sounds in the ambient noise to create the variable associated with each attribute;

using the variable associated with each attribute to identify the prominent sound wave available in the ambient noise; and determining the industry for the non-aggregated merchant based on the prominent sound wave using the model of categorization.

7. The computer-implemented method as claimed in claim 6, wherein storing the mapping of the industry and the merchant comprises:

storing the mapping of the industry and the non-aggregated merchant in the database; and updating the model of categorization by updating the mapping of the industry and the non-aggregated merchant.

8. A server system in a payment network, the server system comprising:

a communication interface configured to receive a payment transaction request and an audio signal comprising an ambient noise in surrounding of a merchant terminal of a merchant, the ambient noise comprising a plurality of sounds;

a memory comprising executable instructions; and a processor communicably coupled to the communication interface and configured to execute the executable instructions to cause the server system to at least:

determine whether the merchant is an aggregated merchant or a non-aggregated merchant;

upon determining that the merchant is the non-aggregated merchant, process the ambient noise to determine a type of the merchant;

map the merchant to an industry from a plurality of industries available in the server system based on the type of the merchant; and store the mapping of the industry and the merchant in a database associated with the server system, wherein upon determining that the merchant is the aggregated merchant, the server system is caused to:

extract one or more attributes for each sound of the plurality of sounds in the ambient noise;

combine each attribute of the one or more attributes with same attribute of the plurality of sounds in the ambient noise to create a variable associated with each attribute;

use the variable associated with each attribute to identify a prominent sound wave available in the ambient noise;

combine each attribute of the one or more attributes of each sound to form a sound wave corresponding to each sound;

determine phase angle of the prominent sound wave and the sound wave associated with each sound;

use the phase angle of the prominent sound wave and the sound wave associated with each sound to determine the type of the merchant;

map the merchant to the industry based on the type of the merchant using the phase angle of the prominent sound wave and the sound wave associated with each sound; and store a merchant-industry mapping for the aggregated merchant in the database.

9. The server system as claimed in claim 8, wherein the server system is a payment server configured to send the payment transaction request to an issuer server for processing a payment from a user account of a payment cardholder associated with the issuer server to a merchant account of the merchant associated with an acquirer server.

10. The server system as claimed in claim 8, wherein a merchant terminal is a point of sale (POS) terminal installed at the merchant place while performing a payment transaction, the POS terminal comprising at least one microphone for recording the ambient noise and generating the audio signal.

11. The server system as claimed in claim 8, wherein the one or more attributes comprise:

amplitude;

frequency;

time; and phase.

12. The server system as claimed in claim 8, wherein the server system is further configured to:

create a model of categorization of the ambient noise for the aggregated merchants, the model of categorization comprising the mapping of the industry and the merchant; and train the model of categorization after each payment transaction if the payment transaction request is received from the aggregated merchant using neural networking, machine learning and artificial intelligence.

13. The server system as claimed in claim 12, wherein for processing the ambient noise, the server system is further caused to:

extract the one or more attributes for each sound of the plurality of sounds in the ambient noise;

combine each attribute of the one or more attributes with same attribute of the plurality of sounds in the ambient noise to create the variable associated with each attribute;

use the variable associated with each attribute to identify the prominent sound wave available in the ambient noise; and determine the industry for the non-aggregated merchant based on the prominent sound wave using the model of categorization.

14. The server system as claimed in claim 13, wherein for storing the mapping of the industry and the merchant, the server system is further caused to:

store the mapping of the industry and the non-aggregated merchant in the database; and update the model of categorization by updating the mapping of the industry and the non-aggregated merchant.

15. A computer-implemented method, comprising:

receiving, by a server system associated with a payment network, a payment transaction request and an audio signal comprising an ambient noise in surrounding of a merchant terminal of a merchant, wherein the ambient noise is recorded by the merchant terminal and comprises a plurality of sounds;

determining, by the server system, whether the merchant is an aggregated merchant or a non-aggregated merchant;

upon determining that the merchant is the aggregated merchant, processing, by the server system, the ambient noise for training a model of categorization of a type of the merchant; and upon determining that the merchant is the non-aggregated merchant, performing processing, by the server system, the ambient noise included in the audio signal, mapping, by the server system, the merchant to an industry from a plurality of industries available in the server system based at least on the model of categorization and processing of the ambient noise, and storing, by the server system, the mapping of the industry and the non-aggregated merchant in a database associated with the server system, wherein processing the ambient noise included in the audio signal comprises:

extracting one or more attributes for each sound of the plurality of sounds in the ambient noise;

combining each attribute of the one or more attributes with same attribute of the plurality of sounds in the ambient noise to create a variable associated with each attribute;

using the variable associated with each attribute to identify a prominent sound wave available in the ambient noise; and determining the industry for the non-aggregated merchant based on the prominent sound wave using the model of categorization.

16. The computer-implemented method as claimed in claim 15, wherein the one or more attributes comprise:
amplitude;
frequency;
time; and
phase.

17. The computer-implemented method as claimed in claim 15, wherein storing the mapping of the industry and the merchant comprises:

storing the mapping of the industry and the non-aggregated merchant in the database; and updating the model of categorization by updating the mapping of the industry and the non-aggregated merchant.

* * * * *